(12) United States Patent
Ichihara

(10) Patent No.: US 9,859,809 B2
(45) Date of Patent: Jan. 2, 2018

(54) POWER CONVERSION DEVICE

(71) Applicant: Mitsubishi Electric Corporation, Tokyo (JP)

(72) Inventor: Masafumi Ichihara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/321,032

(22) PCT Filed: Oct. 23, 2015

(86) PCT No.: PCT/JP2015/079985
§ 371 (c)(1),
(2) Date: Dec. 21, 2016

(87) PCT Pub. No.: WO2017/068720
PCT Pub. Date: Apr. 27, 2017

(65) Prior Publication Data
US 2017/0271998 A1  Sep. 21, 2017

(51) Int. Cl.
H02M 5/458 (2006.01)
(52) U.S. Cl.
CPC .................. H02M 5/458 (2013.01)
(58) Field of Classification Search
CPC .................................. H02M 5/458
See application file for complete search history.

(56) References Cited

U.S. PATENT DOCUMENTS 5,631,813 A * 5/1997 Ikeshita ............. H02M 5/4585
318/377
6,157,097 A * 12/2000 Hirose ................. H02M 7/062
307/125

(Continued)

FOREIGN PATENT DOCUMENTS

JP  06-284571 A  10/1994
JP  07-059359 A   3/1995

(Continued)

OTHER PUBLICATIONS

Communication dated Mar. 15, 2017 issued by the German Patent and Trademark Office in counterpart Application No. 112015002616.9.

(Continued)

Primary Examiner — Adolf Berhane
Assistant Examiner — Bart Iliya
(74) Attorney, Agent, or Firm — Sughrue Mion, PLLC; Richard C. Turner

(57) ABSTRACT

A first control unit outputs a closing-operation command signal to a first switch at a timing calculated based on either a first closing time or a second closing time, whichever is later. The first closing time is a time required for the first switch to transition to a closed state after the first control unit detects a first detection signal indicating that a voltage detected by a voltage detection unit exceeds a predetermined threshold value. The second closing time is a time required for a second switch to transition to a closed state after the first detection signal is detected by a second control unit. The second control unit outputs a closing-operation command signal to the second switch at a timing calculated based on a first time. This can suppress variations in an operating time between a plurality of switches.

4 Claims, 3 Drawing Sheets

(56) References Cited

U.S. PATENT DOCUMENTS

| | | | |
|---|---|---|---|
| 2010/0038962 A1 | 2/2010 | Komatsu | |
| 2010/0164278 A1 | 7/2010 | Oyobe et al. | |
| 2010/0244558 A1 | 9/2010 | Mitsutani et al. | |
| 2013/0234641 A1* | 9/2013 | Li | H02P 27/08 318/503 |
| 2013/0271056 A1* | 10/2013 | Bunte | F03D 7/0224 318/503 |
| 2014/0300298 A1* | 10/2014 | Liu | H02P 3/22 318/380 |

FOREIGN PATENT DOCUMENTS

| | | |
|---|---|---|
| JP | 2008-005658 A | 1/2008 |
| JP | 2008-167620 A | 7/2008 |
| JP | 2009-148139 A | 7/2009 |
| WO | 2015/055211 A1 | 4/2015 |

OTHER PUBLICATIONS

International Search Report for PCT/JP2015/079985 dated Jan. 19, 2016 [PCT/ISA/210].
Written Opinion for PCT/JP2015/079985 dated Jan. 19, 2016 [PCT/ISA/237].

* cited by examiner

POWER CONVERSION DEVICE

CROSS REFERENCE TO RELATED APPLICATIONS

This application is a National Stage of International Application No. PCT/JP2015/079985 filed Oct. 23, 2015, the contents of all of which are incorporated herein by reference in their entirety.

FIELD

The present invention relates to a power conversion device that converts a DC voltage to an AC voltage.

BACKGROUND

There is currently proposed a power conversion device in which a plurality of power conversion units are connected through a common busbar, and supplies power to a load.

Patent Literature 1 discloses a power supply device including a master power-supply unit including a battery, a voltage converter that converts a voltage supplied from the battery of the master power-supply unit, a slave power-supply unit including a battery, a voltage converter that converts a voltage supplied from the battery of the slave power-supply unit, a capacitor that smooths a voltage supplied from each of the two voltage converters, and a sensor that detects a voltage between terminals of the capacitor. When the capacitor is precharged, the power supply device executes control to switch between a relay that switches over the connection state between the capacitor and the battery of the master power-supply unit, and a relay that switches over the connection state between the capacitor and the battery of the slave power-supply unit, based on whether there is a fault in the sensor.

As described above, there is employed DC common-busbar connection in which power-supply-side terminals of a plurality of inverters are connected in parallel and DC-side terminals of the inverters are connected in parallel. A case where two inverters are connected through a DC common busbar is described.

When a power failure occurs, a DC voltage Vdc decreases. At the stage where the DC voltage Vdc decreases to a voltage Vdc1, each of the two inverters executes control to turn off switches of spare charge circuits.

Assuming that the power supply is resumed before the DC voltage Vdc decreases to the voltage Vdc1, each switch of the two inverters is in an on-state. Therefore, a phenomenon occurs, in which a short-circuit charge current flows from the resumed power supply to each of the main-circuit capacitors. A general inverter uses components (such as a converter diode) that can withstand the short-circuit charge current as described above.

CITATION LIST

Patent Literature

Patent Literature 1: Japanese Patent Application Laid-open No. 2009-148139

SUMMARY

Technical Problem

However, in the case of the DC common-busbar connection, when the switch control is executed by the individual inverters independently from each other, or when there are variations in an operating time between the switches, a period during which only one of the switches is in an on-state is generated. When the power supply is resumed during this period, a short-circuit charge current flows through only the circuit of one of the inverters. This may cause damage and degradation of the components of the corresponding inverter.

Particularly, at the time of connecting inverters with different capacitances through a DC common busbar, when a short-circuit charge current which corresponds to a total of both the capacitances flows through the inverter with a lower capacitance, a serious condition occurs. Consequently, there are constraints to DC common-busbar connection of inverters with significantly different capacitances.

The present invention has been achieved to solve the above problems, and an object of the present invention is to provide a power conversion device that can suppress variations in an operating time between a plurality of switches.

Solution to Problem

To solve the above problems and achieve the object, the present invention provides a power conversion device comprising: a first power-supply circuit unit including a first converter to convert an AC voltage supplied from a power supply to a DC voltage, a first circuit unit in which a first switch and a first resistor are connected in parallel, a first capacitor to smooth a DC voltage supplied through the first circuit unit, a first inverter to convert a DC voltage smoothed by the first capacitor to an AC voltage, and a first control unit to control an opening operation and a closing operation of the first switch; a second power-supply circuit unit including a second converter to convert an AC voltage supplied from the power supply to a DC voltage, a second circuit unit in which a second switch and a second resistor are connected in parallel, a second capacitor to smooth a DC voltage supplied through the second circuit unit, a second inverter to convert a DC voltage smoothed by the second capacitor to an AC voltage, and a second control unit to control an opening operation and a closing operation of the second switch; and a voltage detection unit to detect a voltage between ends of the first capacitor, or a voltage between ends of the second capacitor. A line, through which the first circuit unit and the first capacitor are connected, is connected to a line, through which the second circuit unit and the second capacitor are connected, and a line, through which the first converter and the first capacitor are connected, is connected to a line, through which the second converter and the second capacitor are connected. The first control unit outputs a closing-operation command signal to the first switch based on either a first closing time or a second closing time, whichever is later, where the first closing time is a time required for the first switch to transition to a closed state after the first control unit detects a first detection signal indicating that a voltage detected by the voltage detection unit exceeds a predetermined threshold value, and the second closing time is a time required for the second switch to transition to a closed state after the first detection signal is detected by the second control unit. The second control unit outputs a closing-operation command signal to the second switch based on either the first closing time or the second closing time, whichever is later. The first control unit outputs an opening-operation command signal to the first switch based on either a first opening time or a second opening time, whichever is later, where the first opening time is a time required for the first switch to transition to an opened state after the first control unit detects a second detection signal indicating that a voltage detected by the voltage detection unit is below a predetermined threshold value, and the second opening time is a time required for the second switch to transition to an opened state after the second detection signal is detected by the second control unit. The second control unit outputs an opening-operation command signal to the second switch based on either the first opening time or the second opening time, whichever is later.

Advantageous Effects of Invention

The power conversion device according to the present invention can suppress variations in an operating time between a plurality of switches.

DESCRIPTION OF EMBODIMENTS

Exemplary embodiments of a power conversion device according to the present invention will be described below in detail with reference to the accompanying drawings. The present invention is not limited to the embodiments.

First Embodiment

Figure 1:
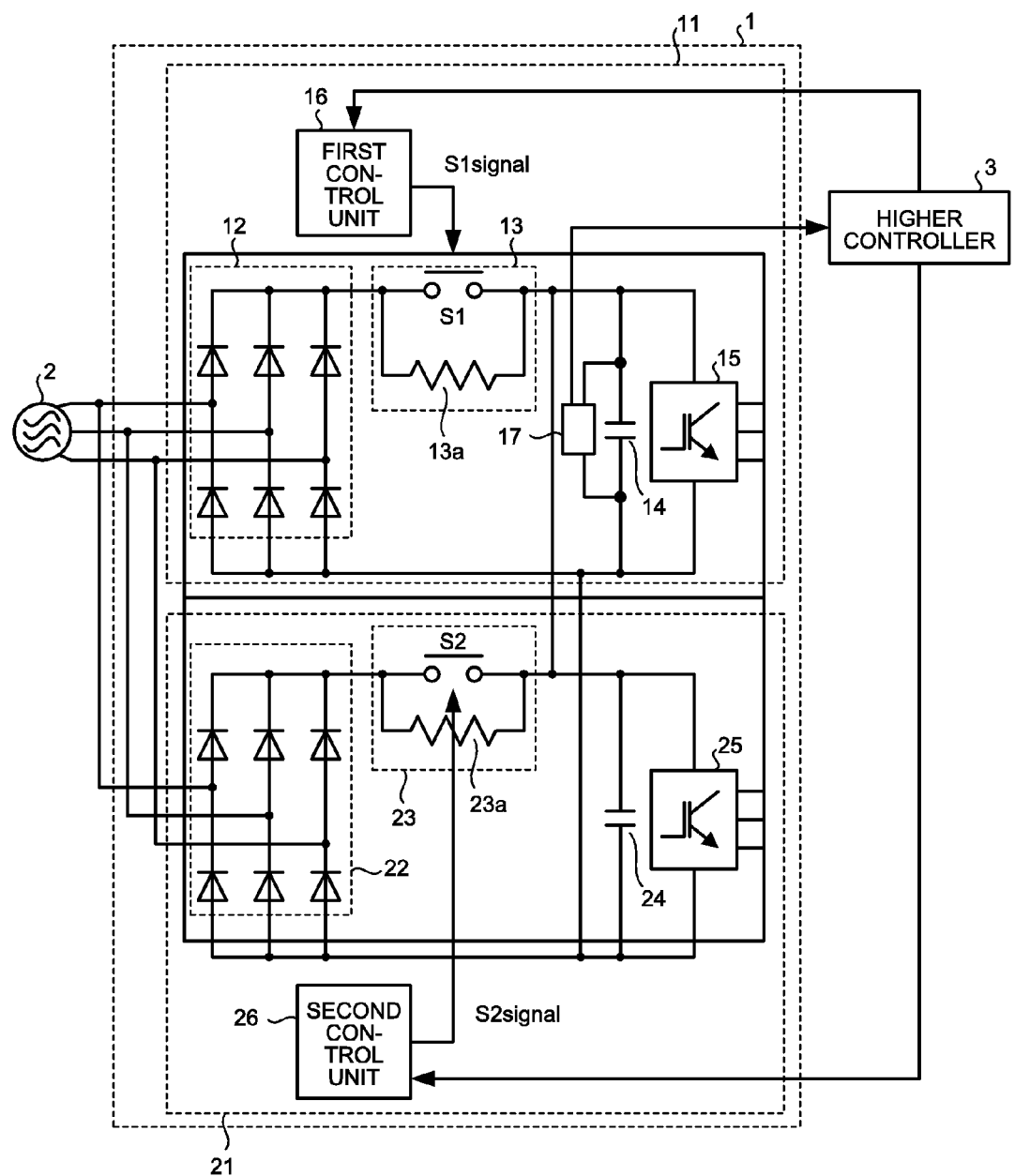
FIG. 1 is a configuration diagram of a power conversion device according to a first embodiment.

FIG. 1 is a diagram illustrating a configuration of a power conversion device 1 according to a first embodiment. The power conversion device 1 is configured by connecting a first power-supply circuit unit 11 that converts a voltage, and a second power-supply circuit unit 21 that converts a voltage, in parallel.

The first power-supply circuit unit 11 includes a first converter 12 that converts an AC voltage supplied from a power supply 2 to a DC voltage, a first circuit unit 13 in which a first switch S1 and a first resistor 13a are connected in parallel, a first capacitor 14 that smooths a DC voltage supplied through the first circuit unit 13, a first inverter 15 that converts a DC voltage smoothed by the first capacitor 14 to an AC voltage, a first control unit 16 that controls an opening operation and a closing operation of the first switch S1, and a voltage detection unit 17 that detects a voltage between ends of the first capacitor 14. In the first embodiment, the voltage detection unit 17 is described as being configured to detect a voltage between the ends of the first capacitor 14. However, the voltage detection unit 17 is not limited to the above configuration. It is also possible that the voltage detection unit 17 is configured to detect a voltage between ends of a second capacitor 24 described later. The first power-supply circuit unit 11 and the second power-supply circuit unit 21 are connected through a common busbar, and thus the quantity of electricity in the first capacitor 14 is the same as that in the second capacitor 24.

The second power-supply circuit unit 21 includes a second converter 22 that converts an AC voltage supplied from the power supply 2 to a DC voltage, a second circuit unit 23 in which a second switch S2 and a second resistor 23a are connected in parallel, the second capacitor 24 that smooths a DC voltage supplied through the second circuit unit 23, a second inverter 25 that converts a DC voltage smoothed by the second capacitor 24 to an AC voltage, and a second control unit 26 that controls an opening operation and a closing operation of the second switch S2.

A line, through which the first circuit unit 13 and the first capacitor 14 are connected, is connected to a line, through which the second circuit unit 23 and the second capacitor 24 are connected. A line, through which the first converter 12 and the first capacitor 14 are connected, is connected to a line, through which the second converter 22 and the second capacitor 24 are connected.

The first control unit 16 outputs a closing-operation command signal S1signal (ON) to the first switch S1 at a timing calculated based on either a first closing time or a second closing time, whichever is later. The first closing time is a time required for the first switch S1 to transition to a closed state after the first control unit 16 detects a first detection signal indicating that a voltage detected by the voltage detection unit 17 exceeds a predetermined threshold value. The second closing time is a time required for the second switch S2 to transition to a closed state after the first detection signal is detected by the second control unit 26. Hereinafter, the first detection signal is referred to as "Smain (ON)". Further, either the first closing time or the second closing time, whichever is later, is referred to as "first time tson".

The second control unit 26 outputs a closing-operation command signal S2signal (ON) to the second switch S2 at a timing calculated based on the first time tson.

Upon detecting that a voltage detected by the voltage detection unit 17 exceeds a predetermined threshold value, a higher controller 3 generates the Smain (ON), and outputs the generated Smain (ON) to the first control unit 16 and the second control unit 26.

The first closing time is a total time of a first standby time ts1on required for the Smain (ON) to be detected by the first control unit 16, and a first transition time td1on required for the first switch S1 to transition to a closed state after receiving the closing-operation command signal S1signal (ON) from the first control unit 16.

The second closing time is a total time of a second standby time ts2on required for the Smain (ON) to be detected by the second control unit 26, and a second transition time td2on required for the second switch S2 to transition to a closed state after receiving the closing-operation command signal S2signal (ON) from the second control unit 26.

The first control unit 16 outputs an opening-operation command signal S1signal (OFF) to the first switch S1 at a timing calculated based on either a first opening time or a second opening time, whichever is later. The first opening time is a time required for the first switch S1 to transition to an opened state after the first control unit 16 detects a second detection signal indicating that a voltage detected by the voltage detection unit 17 is below a predetermined threshold value. The second opening time is a time required for the second switch S2 to transition to an opened state after the second detection signal is detected by the second control unit 26. Hereinafter, the second detection signal is referred to as "Smain (OFF)". Further, either the first opening time or the second opening time, whichever is later, is referred to as "second time tsoff".

The second control unit 26 outputs an opening-operation command signal S2signal (OFF) to the second switch S2 based on the second time tsoff.

Upon detecting that a voltage detected by the voltage detection unit 17 is below a predetermined threshold value, the higher controller 3 generates an Smain (OFF), and outputs the generated Smain (OFF) to the first control unit 16 and the second control unit 26.

The first opening time is a total time of a third standby time ts1off required for the Smain (OFF) to be detected by the first control unit 16, and a third transition time td1off required for the first switch S1 to transition to an opened state after receiving the opening-operation command signal S1signal (OFF) from the first control unit 16.

A second opening time is a total time of a fourth standby time ts2off required for the Smain (OFF) to be detected by the second control unit 26, and a fourth transition time td2off required for the second switch S2 to transition to an opened state after receiving the opening-operation command signal S2signal (OFF) from the second control unit 26.

Figure 2:
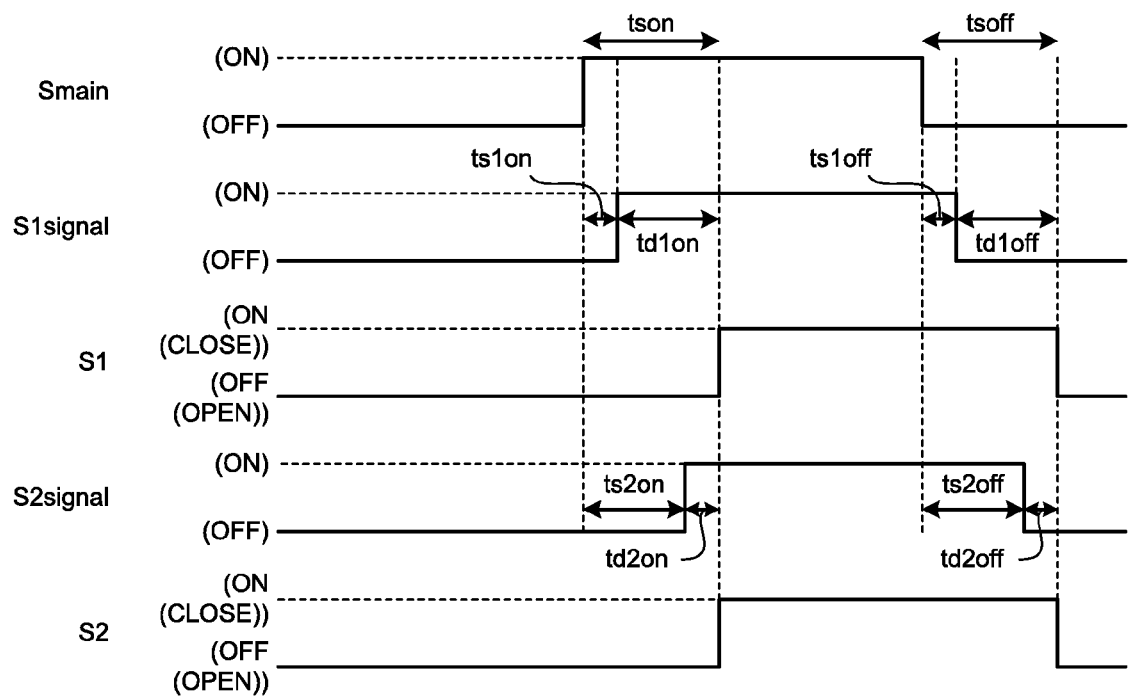
FIG. 2 is a timing chart for describing operations of a first power-supply circuit unit and a second power-supply circuit unit according to the first embodiment.
Figure 3:
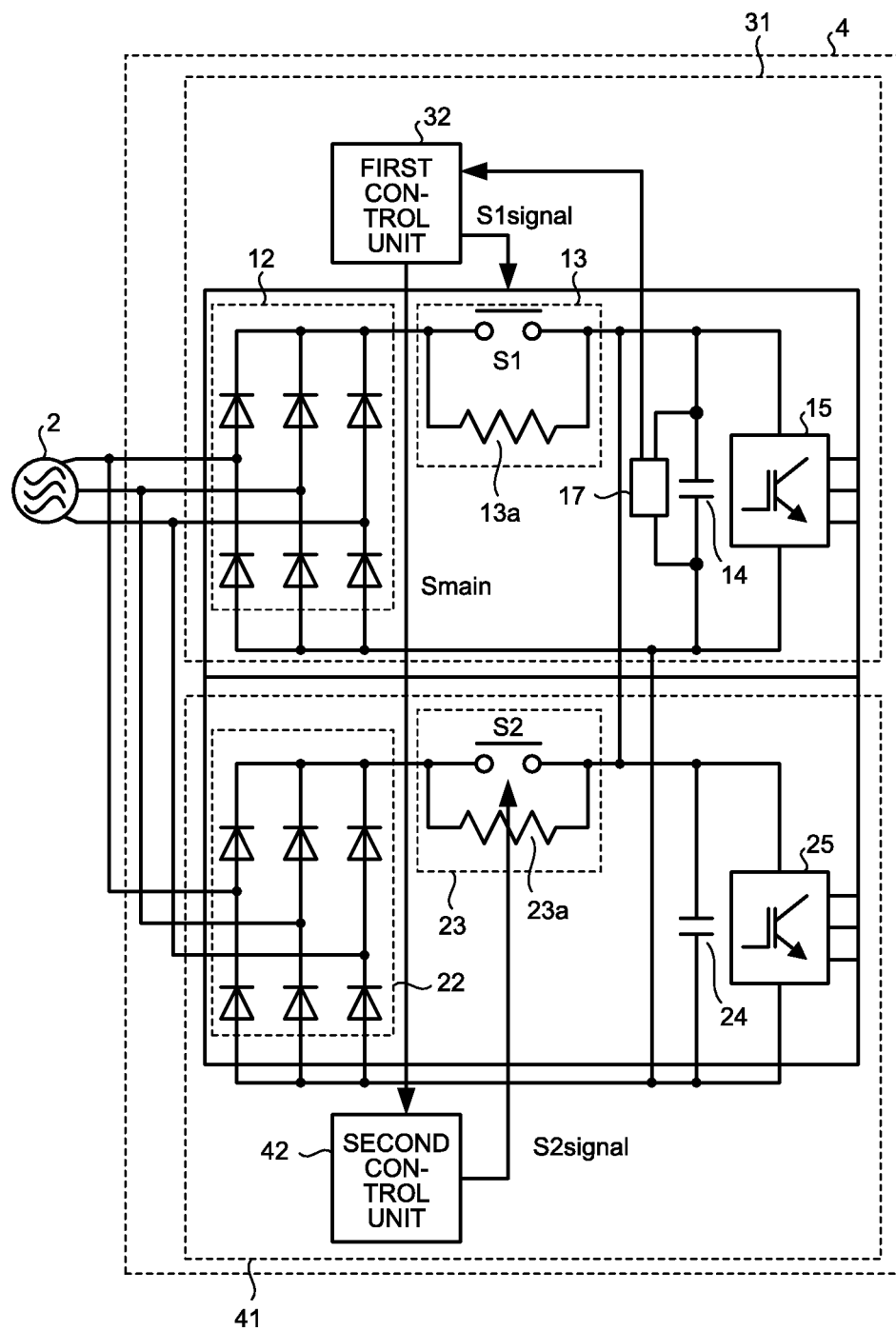
FIG. 3 is a configuration diagram of a power conversion device according to a second embodiment.

An operation of the first power-supply circuit unit 11 and the second power-supply circuit unit 21 is described with reference to a timing chart illustrated in FIG. 2. The descriptions are given below assuming that an operating time of the first switch S1 is longer than that of the second switch S2. Further, there is described the operation of the first power-supply circuit unit 11 and the second power-supply circuit unit 21 when these power-supply circuit units 11 and 21 are supplied with a voltage from the power supply 2 after a state in which these power-supply circuit units 11 and 21 have not yet been supplied with a voltage from the power supply 2, the first switch S1 and the second switch S2 are in an opened state, and the first capacitor 14 and the second capacitor 24 have not yet been charged. Furthermore, the first time tson that is either the first closing time or the second closing time, whichever is later, is decided in advance.

Upon detecting that a voltage detected by the voltage detection unit 17 exceeds a predetermined threshold value, the higher controller 3 generates the Smain (ON), and outputs the generated Smain (ON) to the first control unit 16 and the second control unit 26.

The first control unit 16 detects the Smain (ON), and then outputs the command signal S1signal (ON) to the first switch S1, such that the first switch S1 is brought to a closed state after a lapse of the first time tson. It takes the first transition time td1on for the first switch S1 to be brought to a closed state in practice after receiving the closing-operation command signal S1signal (ON) from the first control unit 16. Therefore, the first control unit 16, in view of the first transition time td1on, delays outputting the command signal S1signal (ON) by the first standby time ts1on that is equal to "first time tson−first transition time td1on". The first control unit 16 detects the Smain (ON), and then the first switch S1 is brought to a closed state after a lapse of the first time tson.

The second control unit 26 detects the Smain (ON), and then outputs the command signal S2signal (ON) to the second switch S2, such that the second switch S2 is brought to a closed state after a lapse of the first time tson. It takes the second transition time td2on for the second switch S2 to be brought to a closed state in practice after receiving the closing-operation command signal S2signal (ON) from the second control unit 26. Therefore, the second control unit 26, in view of the second transition time td2on, delays outputting the command signal S2signal (ON) by the second standby time ts2on that is equal to "first time tson−second transition time td2on". The second control unit 26 detects the Smain (ON), and then the second switch S2 is brought to a closed state after a lapse of the first time tson.

Accordingly, the power conversion device 1 can bring the first switch S1 and the second switch S2 to a closed state after a lapse of the first time tson, and therefore can suppress variations in an operating time between a plurality of switches.

Next, there is described an operation of the first power-supply circuit unit 11 and the second power-supply circuit unit 21 when supply of a voltage from the power supply 2 to the power-supply circuit unit 11 and the power-supply circuit unit 21 is stopped after a state in which these power-supply circuit units 11 and 21 have been supplied with power from the power supply 2, the first switch S1 and the second switch S2 are in a closed state, and the first capacitor 14 and the second capacitor 24 have been charged. Further, the second time tsoff that is either the first opening time or the second opening time, whichever is later, is decided in advance.

Upon detecting that a voltage detected by the voltage detection unit 17 is below a predetermined threshold value, the higher controller 3 generates the Smain (OFF), and outputs the generated Smain (OFF) to the first control unit 16 and the second control unit 26.

The first control unit 16 detects the Smain (OFF), and then outputs the command signal S1signal (OFF) to the first switch S1, such that the first switch S1 is brought to an opened state after a lapse of the second time tsoff. It takes the third transition time td1off for the first switch S1 to be brought to an opened state in practice after receiving the opening-operation command signal S1signal (OFF) from the first control unit 16. Therefore, the first control unit 16, in view of the third transition time td1off, delays outputting the command signal S1signal (OFF) by the third standby time ts1off that is equal to "second time tsoff−third transition time td1off". The first control unit 16 detects the Smain (OFF), and then the first switch S1 is brought to an opened state after a lapse of the second time tsoff.

The second control unit 26 detects the Smain (OFF), and then outputs the command signal S2signal (OFF) to the second switch S2, such that the second switch S2 is brought to an opened state after a lapse of the second time tsoff. It takes the fourth transition time td2off for the second switch S2 to be brought to an opened state in practice after receiving the opening-operation command signal S2signal (OFF) from the second control unit 26. Therefore, the second control unit 26, in view of the fourth transition time td2off, delays outputting the command signal S2signal (OFF) by the fourth standby time ts2off that is equal to "second time tsoff−fourth transition time td2off". The second control unit 26 detects the Smain (OFF), and then the second switch S2 is brought to an opened state after a lapse of the second time tsoff.

Accordingly, the power conversion device 1 can bring the first switch S1 and the second switch S2 to an opened state after a lapse of the second time tsoff, and therefore can suppress variations in an operating time between a plurality of switches.

<Answer-Back Function>

It is also possible that the first switch S1 has an answer-back function of notifying the first control unit 16 of the first transition time td1on required for the first switch S1 to transition to a closed state after receiving the closing-operation command signal S1signal (ON) from the first control unit 16, and the third transition time td1off required for the first switch S1 to transition to an opened state after receiving the opening-operation command signal S1signal (OFF) from the first control unit 16.

Further, it is also possible that the second switch S2 has an answer-back function of notifying the second control unit 26 of the second transition time td2on required for the second switch S2 to transition to an opened state after receiving the closing-operation command signal S2signal (ON) from the second control unit 26, and the fourth transition time td2off required for the second switch S2 to transition to a closed state after receiving the opening-operation command signal S2signal (OFF) from the second control unit 26.

Owing to the above configuration, the power conversion device 1 can accurately calculate the first time tson and the second time tsoff, and can improve simultaneity of the timing of bringing the first switch S1 and the second switch S2 to an opened state, and simultaneity of the timing of bringing the first switch S1 and the second switch S2 to a closed state.

<Solution to Transmission Delay>

In a case where the distance between the higher controller 3 and the first control unit 16 is short, and the distance between the higher controller 3 and the second control unit 26 is long, or where there is a relay device between the higher controller 3 and the second control unit 26, a considerable amount of time may be required for the Smain (ON) and the Smain (OFF), which are output from the higher controller 3, to reach the second control unit 26. As described above, when the Smain (ON) and the Smain (OFF) are transmitted to the second control unit 26 with a significant delay, it is also possible that in consideration of the time period of the corresponding transmission delay, the first standby time ts1on, the second standby time ts2on, the third standby time ts1off, and the fourth standby time ts2off are adjusted.

Hereinafter, the time period of the transmission delay of the Smain (ON) is referred to as "first transmission-delay time tsmdon". Further, the time period of the transmission delay of the Smain (OFF) is referred to as "second transmission-delay time tsmdoff".

There is described a case where in the first power-supply circuit unit 11, the first transmission-delay time tsmdon and the second transmission-delay time tsmdoff are taken into consideration.

The first power-supply circuit unit 11 decides the first standby time ts1on based on an equation (1). An equation (2) expresses the first standby time ts1on when the first transmission-delay time tsmdon is not taken into consideration.

First standby time $ts1\text{on}$=first time $ts\text{on}$−first transition time $td1\text{on}$+first transmission-delay time $tsmd\text{on}$ (1)

First standby time $ts1\text{on}$=first time $ts\text{on}$−first transition time $td1\text{on}$ (2)

Further, the first power-supply circuit unit 11 decides the third standby time ts1off based on an equation (3). An equation (4) expresses the third standby time ts1off when the second transmission-delay time tsmdoff is not taken into consideration.

Third standby time $ts1\text{off}$=second time $ts\text{off}$−third transition time $td1\text{off}$+second transmission-delay time $tsmd\text{off}$ (3)

Third standby time $ts1\text{off}$=second time $ts\text{off}$−third transition time $td1\text{off}$ (4)

Next, there is described a case where in the second power-supply circuit unit 21, the first transmission-delay time tsmdon and the second transmission-delay time tsmdoff are taken into consideration.

The second power-supply circuit unit 21 decides the second standby time ts2on based on an equation (5). An equation (6) expresses the second standby time ts2on when the first transmission-delay time tsmdon is not taken into consideration.

Second standby time $ts2\text{on}$=first time $ts\text{on}$−second transition time $td2\text{on}$−first transmission-delay time $tsmd\text{on}$ (5)

Second standby time $ts2\text{on}$=first time $ts\text{on}$−second transition time $td2\text{on}$ (6)

Further, the second power-supply circuit unit 21 decides the fourth standby time ts2off based on an equation (7). An equation (8) expresses the fourth standby time ts2off when the second transmission-delay time tsmdoff is not taken into consideration.

Fourth standby time $ts2\text{off}$=second time $ts\text{off}$−fourth transition time $td2\text{off}$−second transmission-delay time $tsmd\text{off}$ (7)

Fourth standby time $ts2\text{off}$=second time $ts\text{off}$−fourth transition time $td2\text{off}$ (8)

Owing to the above configuration, in the power conversion device 1, even when the Smain (ON) and the Smain (OFF) are transmitted to the second control unit 26 with a significant delay, the first power-supply circuit unit 11 or the second power-supply circuit unit 21 adjusts the transmission delay. Therefore, the power conversion device 1 can bring the first switch S1 and the second switch S2 to a closed state after a lapse of the first time tson, and can also bring the first switch S1 and the second switch S2 to an opened state after a lapse of the second time tsoff. Accordingly, the power conversion device 1 can suppress variations in an operating time between a plurality of switches.

In the first embodiment, the power conversion device 1, in which the first power-supply circuit unit 11 and the second power-supply circuit unit 21 are connected in parallel, is illustrated as an example. However, the number of power-supply circuit units is not limited to two, and it is also possible that three or more power-supply circuit units are connected in parallel.

Second Embodiment

Next, a second embodiment is described. The second embodiment is different from the first embodiment in that the higher controller 3 is not provided. In the following descriptions, constituent elements identical to those of the power conversion device 1 according to the first embodiment are denoted by like reference signs and explanations thereof will be omitted.

A power conversion device 4 is configured by connecting a first power-supply circuit unit 31 that converts a voltage, and a second power-supply circuit unit 41 that converts a voltage, in parallel.

The first power-supply circuit unit 31 includes the first converter 12 that converts an AC voltage supplied from the power supply 2 to a DC voltage, the first circuit unit 13 in which the first switch S1 and the first resistor 13a are connected in parallel, the first capacitor 14 that smooths a DC voltage supplied through the first circuit unit 13, the first inverter 15 that converts a DC voltage smoothed by the first capacitor 14 to an AC voltage, a first control unit 32 that controls an opening operation and a closing operation of the first switch S1, and the voltage detection unit 17 that detects a voltage between the ends of the first capacitor 14.

The second power-supply circuit unit 41 includes the second converter 22 that converts an AC voltage supplied from the power supply 2 to a DC voltage, the second circuit unit 23 in which the second switch S2 and the second resistor 23a are connected in parallel, the second capacitor 24 that smooths a DC voltage supplied through the second circuit unit 23, the second inverter 25 that converts a DC voltage smoothed by the second capacitor 24 to an AC voltage, and a second control unit 42 that controls an opening operation and a closing operation of the second switch S2.

Upon detecting that a voltage detected by the voltage detection unit 17 exceeds a threshold value, the first control unit 32 generates the Smain (ON), and outputs the Smain (ON) to the second control unit 42. Further, the first control unit 32 outputs the closing-operation command signal S1signal to the first switch S1 at a timing calculated based on either a first closing time or a second closing time, whichever is later. The first closing time is a time required for the first switch S1 to transition to a closed state after the first control unit 32 detects the Smain (ON). The second closing time is a time required for the second switch S2 to transition to a closed state after the Smain (ON) is detected by the second control unit 42. Hereinafter, the first detection signal is referred to as "Smain (ON)". Further, either the first closing time or the second closing time, whichever is later, is referred to as "first time tson".

The second control unit 42 outputs the closing-operation command signal S2signal (ON) to the second switch S2 at a timing calculated based on the first time tson.

Upon detecting that a voltage detected by the voltage detection unit 17 is below a predetermined threshold value, the first control unit 32 generates the Smain (OFF), and outputs the Smain (OFF) to the second control unit 42. Further, the first control unit 32 outputs the opening-operation command signal S1signal to the first switch S1 at a timing calculated based on either a first opening time or a second opening time, whichever is later. The first opening time is a time required for the first switch S1 to transition to an opened state after the first control unit 32 detects the Smain (OFF). The second opening time is a time required for the second switch S2 to transition to an opened state after the Smain (OFF) is detected by the second control unit 42. Hereinafter, the second detection signal is referred to as "Smain (OFF)". Further, either the first opening time or the second opening time, whichever is later, is referred to as "second time tsoff".

The second control unit 42 outputs the opening-operation command signal S2signal (OFF) to the second switch S2 based on the second time tsoff.

As described above, in the power conversion device 4, the first control unit 32 on the master side generates the Smain (ON) and the Smain (OFF), and outputs the Smain (ON) and the Smain (OFF) to the second control unit 42 on the slave side. Therefore, the power conversion device 4 does not need a higher controller, and can still bring the first switch S1 and the second switch S2 to a closed state after a lapse of the first time tson, and can also bring the first switch S1 and the second switch S2 to an opened state after a lapse of the second time tsoff. Accordingly, the power conversion device 4 can suppress variations in an operating time between a plurality of switches.

The configurations described in the embodiment are only an example of the contents of the present invention. The configurations can be combined with other well-known techniques, and can be configured while modifying it without departing from the scope of the invention, such as omitting a part the configuration.

REFERENCE SIGNS LIST 1, 4 power conversion device, 2 power supply, 3 higher controller, 11, 31 first power-supply circuit unit, first converter, 13 first circuit unit, 13a first resistor, 14 first capacitor, 15 first inverter, 16, 32 first control unit, 17 voltage detection unit, 21, 41 second power-supply circuit unit, 22 second converter, 23 second circuit unit, 23a second resistor, 24 second capacitor, 25 second inverter, 26, 42 second control unit, S1 first switch, S2 second switch.

The invention claimed is:

1. A power conversion device comprising:
a first power-supply circuit unit including
a first converter to convert an AC voltage supplied from a power supply to a DC voltage,
a first circuit unit in which a first switch and a first resistor are connected in parallel,
a first capacitor to smooth a DC voltage supplied through the first circuit unit,
a first inverter to convert a DC voltage smoothed by the first capacitor to an AC voltage, and
a first control unit to control an opening operation and a closing operation of the first switch;
a second power-supply circuit unit including
a second converter to convert an AC voltage supplied from the power supply to a DC voltage,
a second circuit unit in which a second switch and a second resistor are connected in parallel,
a second capacitor to smooth a DC voltage supplied through the second circuit unit,
a second inverter to convert a DC voltage smoothed by the second capacitor to an AC voltage, and
a second control unit to control an opening operation and a closing operation of the second switch; and
a voltage detection unit to detect a voltage between ends of the first capacitor, or a voltage between ends of the second capacitor, wherein
a line, through which the first circuit unit and the first capacitor are connected, is connected to a line, through which the second circuit unit and the second capacitor are connected, and a line, through which the first converter and the first capacitor are connected, is connected to a line, through which the second converter and the second capacitor are connected,
the first control unit outputs a closing-operation command signal to the first switch based on either a first closing time or a second closing time, whichever is later, where the first closing time is a time required for the first switch to transition to a closed state after the first control unit detects a first detection signal indicating that a voltage detected by the voltage detection unit exceeds a predetermined threshold value, and the second closing time is a time required for the second switch to transition to a closed state after the first detection signal is detected by the second control unit,
the second control unit outputs a closing-operation command signal to the second switch based on either the first closing time or the second closing time, whichever is later,
the first control unit outputs an opening-operation command signal to the first switch based on either a first opening time or a second opening time, whichever is later, where the first opening time is a time required for the first switch to transition to an opened state after the first control unit detects a second detection signal indicating that a voltage detected by the voltage detection unit is below a predetermined threshold value, and the second opening time is a time required for the second switch to transition to an opened state after the second detection signal is detected by the second control unit, and the second control unit outputs an opening-operation command signal to the second switch based on either the first opening time or the second opening time, whichever is later.

2. The power conversion device according to claim 1, wherein the first closing time is a total time of a first time required for the first detection signal to be detected by the first control unit, and a first transition time required for the first switch to transition to a closed state after receiving a closing-operation command signal from the first control unit, the second closing time is a total time of a second time required for the first detection signal to be detected by the second control unit, and a second transition time required for the second switch to transition to a closed state after receiving a closing-operation command signal from the second control unit, the first opening time is a total time of a third time required for the second detection signal to be detected by the first control unit, and a third transition time required for the first switch to transition to an opened state after receiving an opening-operation command signal from the first control unit, and the second opening time is a total time of a fourth time required for the second detection signal to be detected by the second control unit, and a fourth transition time required for the second switch to transition to an opened state after receiving an opening-operation command signal from the second control unit.

3. The power conversion device according to claim 1, wherein when a voltage detected by the voltage detection unit exceeds the threshold value, the first control unit generates the first detection signal and outputs the first detection signal to the second control unit, and when a voltage detected by the voltage detection unit is below a predetermined threshold value, the first control unit generates the second detection signal and outputs the second detection signal to the second control unit.

4. The power conversion device according to claim 2, wherein the first switch notifies the first control unit of the first transition time and the third transition time, and the second switch notifies the second control unit of the second transition time and the fourth transition time.

* * * * *